United States Patent [19]

Berger et al.

[11] Patent Number: 5,293,185
[45] Date of Patent: Mar. 8, 1994

[54] EYEGLASS FRAME PERMITTING INTERCHANGING OF LENSES

[76] Inventors: Ray A. Berger, 826 West Pajabon Dr., Palmyra, Pa. 17078; David H. Foster, 108 Meadowlark Rd., Reading, Pa. 19606

[21] Appl. No.: 945,914

[22] Filed: Sep. 17, 1992

[51] Int. Cl.⁵ ............................................. G02C 1/08
[52] U.S. Cl. ................................. 351/95; 351/96
[58] Field of Search ........................ 351/90–102, 351/85, 86

[56] References Cited

U.S. PATENT DOCUMENTS

| | | | |
|---|---|---|---|
| 1,721,170 | 7/1929 | Wrighton | 351/102 |
| 2,103,421 | 12/1937 | Aspenleiter | 351/98 |
| 2,738,709 | 3/1956 | Matthews et al. | 351/86 |
| 2,921,500 | 1/1960 | Gell | 351/90 |
| 3,179,950 | 4/1965 | Gross et al. | 351/91 |
| 3,473,869 | 10/1969 | Pluznik et al. | 351/95 |
| 3,826,564 | 7/1974 | Werlong, Sr. | 351/45 |
| 4,360,252 | 11/1982 | Solomon | 351/95 |
| 4,813,775 | 3/1989 | Kaksonen | 351/92 |
| 5,098,180 | 3/1992 | Tobey | 351/97 |

FOREIGN PATENT DOCUMENTS

| | | | |
|---|---|---|---|
| 0079577 | 5/1983 | European Pat. Off. | 351/96 |
| 356566 | 7/1905 | France | 351/97 |
| 18692 | 10/1893 | United Kingdom | 351/95 |
| 22036 | 10/1906 | United Kingdom | 351/95 |

*Primary Examiner*—Bruce Y. Arnold
*Assistant Examiner*—R. D. Shafer

[57] ABSTRACT

An eyeglass frame having removable lenses, comprising of lens rings which are split into an upper and lower ring portion. Interposed between the upper and lower ring portions, and forming an integral part of the frame and positive actuating means to force open and draw closed the split lens rings to facilitate insertion and removal of lens. Several spices of eyeglass frame are visualized The preferred spieces utilizes a coil spring and resilient rod. Another spieces visualized utilizes several serrated coupling edges and an actuating fulcrum.

6 Claims, 6 Drawing Sheets

EYEGLASS FRAME PERMITTING INTERCHANGING OF LENSES

FIELD OF THE INVENTION

This invention relates in general to optics and in particular to an eyeglass frame permitting interchanging of lenses without any tools.

BACKGROUND OF THE INVENTION

This invention pertains to and is concerned with an eyeglass frame with detachably mounted lenses having a prescription axis alignment system and safety locking feature to assure correct optical positioning of the lenses with no possibility of the lenses separating from the frame. The eyeglass frames of this invention are primarily intended for use with prescription lenses and prescription sunglasses. The most immediate application of these eyeglass frames permits the wearer to interchange a single pair of prescription lenses into multiple frames for fashion considerations. The eyeglass frames are constructed in a rather conventional manner insofar as lenses and temple members are concerned. The modification of the present invention resides in the means of securing the lenses within the lens rings. The lens rings are of a split-ring type of construction wherein the upper and lower portions of the rings may be separated slightly to allow removal of lenses and then drawn together to secure the changed lenses in the lens ring. The opening and closing means used in the split-ring construction of the lens rings may be constructed in a variety of configurations.

DESCRIPTION OF THE PRIOR ART

Other inventors have disclosed eyeglass frames having detachably mounted lenses with only limited utility and success. One attempt was Solomon, U.S. Pat. No. 4,360,252, which similarly utilized a split-ring lens ring. The coil spring embodiment of Solomon's disclosure tended to stretch and weaken with repeated use allowing the lenses to separate from the frame. The present invention remedies this problem by using a metal rod inside the coil spring which utilizes compression only of the coil spring when opening the splitrings, thereby eliminating extension of the coil spring which has a debilitating effect on the coil spring over time. The metal rod additionally insures proper alignment of the split rings and is configured to provide a safety locking mechanism. Solomon's disclosure did not address the problem of lens rotation which is critical with astigmatics and bifocal wearers. Porsche, U.S. Pat. No. 4,834,523, used prong-receiving recesses to secure the lenses to the frame, thereby eliminating lens rotation. While feasible, Porsche's method does not allow the use of standard, automated edging equipment to cut the lens, thereby significantly increasing the cost. The present invention will assure proper prescription axis alignment by using a single, concave notch on the lens which can be added by hand with a file or edging stone after the lens has been edged on standard automated equipment. The notch is aligned with a projection molded into the lens-ring on the 90° or 180° axis. Another embodiment would utilize a protrussion on the lens which would mate with a concave notch on the lens ring surface. The following patents relating to eyeglass frames with detachably mounted lenses are cited for the examiner's reference, but do not read on or anticipate the invention herein disclosed:

(a) U.S. Pat. No. 3,427,098 to D.L. Johnston;
(b) U.S. Pat. No. 2,738,709 to R.C. Matthews, et al.;
(c) U.S. Pat. No. 2,652,746 to R.R. Shanks;
(d) U.S. Pat. No. 1,308,477 to W. N. Blanchard;
(e) U.S. Pat. No. 4,176,921 to J. H. Matthias;
(f) U.S. Pat. No. 4,983,030 to R. L. Chandler;
(g) U.S. Pat. No. 4,504,127 to J. Cottet and
(h) U.S. Pat. No. 4,759,622 to J. J. Schmidtbaier.

None of the referenced inventions uses a safety locking system to secure lenses in the frame front without a tool as disclosed in the present invention.

SUMMARY OF THE INVENTION

According to the present invention, eyeglass frames having removable lenses incorporated in the invention of this disclosure utilize eyeglass frames of a split-ring construction having conventional temple pieces. The split-ring lens rings are secured to each other by means of a coil spring and metal rod device. Correct prescription axis alignment is obtained through a lens notch which mates with a projection molded into the lens ring. The upper portion of the rod has a resilience allowing a projection to protrude through any of several openings in the posterior upper lens ring. Other embodiments of the safety locking device are feasible, but the described embodiment is preferred because of ease of manufacturing and cost effectiveness.

DETAILED DESCRIPTION OF THE PREFERRED EMBODIMENT

Figure 1:
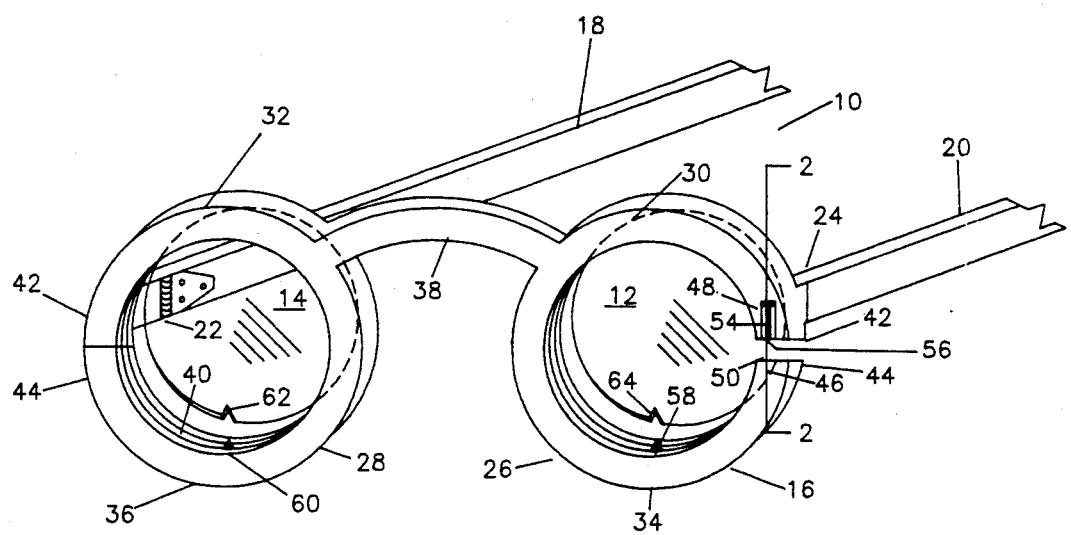
FIG. 1 is a front perspective view of a pair of eyeglasses employing the invention.

For a detailed description of the preferred embodiment and an alternative specie, reference is made to the attached several views wherein identical reference characters will be utilized to refer to identical or equivalent components throughout the various views and following description.

Referring now to FIG. 1, a pair of eyeglasses 10 includes lenses 12 and 14, a frame 16, and temple pieces 18 and 20. The temple pieces 18 and 20 are attached to the frame 16 by means of temple attachment or hinge portions 22 and 24, of conventional design. The frame 16 includes an integral pair of lens mounting rings 26 and 28, each having an upper 30 and 32 portion joined by a bridging portion 38. The frame 16 maintains the eyeglass lenses 12 and 14 mounted in each of the ring portions 26 and 28 in a spaced relationship to each other for proper disposition in front of the wearer's eyes. The lens mounting rings 26 and 28 have a groove 40 around the inner side thereto in which the outer edge of the lens 12 or 14 are disposed and held. Each ring 26 and 28 is split at at least one point along the ring forming an upper ring portion end 42 and a lower ring portion end 44. An aperture 46 is axially bored within the ring portion end 44. A chamber 48 is axially bored within the upper ring portion end 42. The lower lens mounting rings 34 and 36 contain a projection 58 and 60 on the grooved surface 40 to mate with a notch 62 and 64 which assures correct prescription axis alignment.

Figure 2:
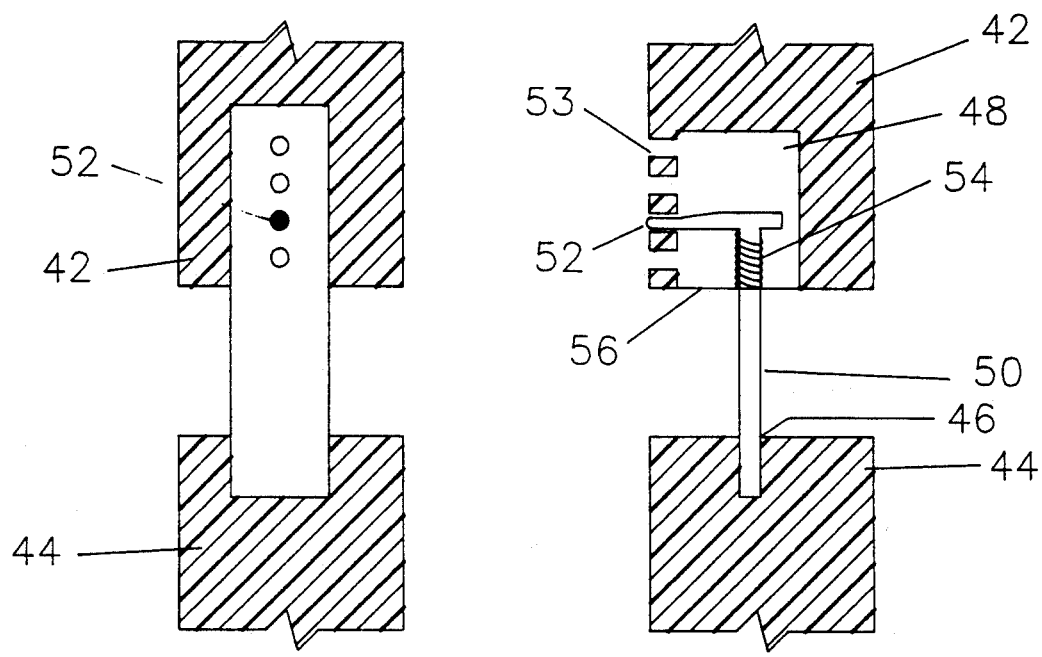
FIG. 2 is a partial cross-section of FIG. 1 along section line 2—2 showing the coil spring-resilient rod embodiment of the invention.
Figure 3:
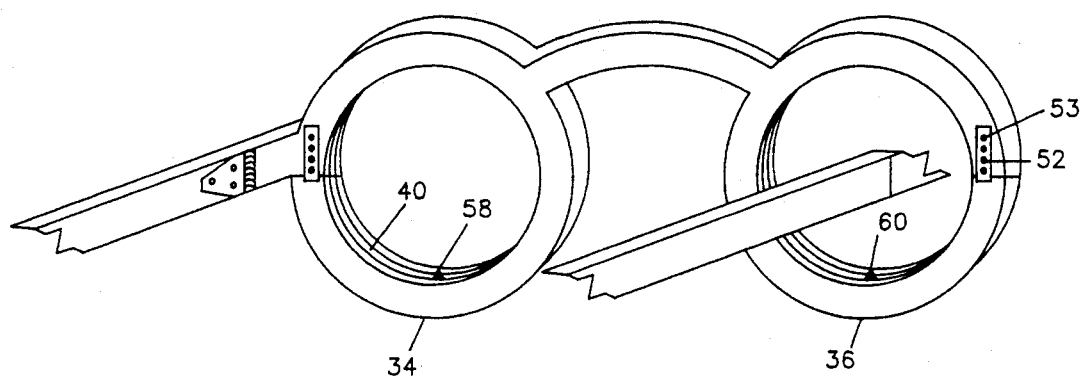
FIG. 3 shows the positioning of the resilient rod protruding through the posterior upper lens ring.

Referring to FIG. 2 for a more detailed disclosure of the split ring 26, a resilient rod 50 is secured within the aperture 46. The resilient rod 50 extends into chamber 48 and is shaped with a projection 52 which extends through any of several openings 53 molded into the posterior upper lens rings 30 and 32. The resilient rod 50 extends through a coil spring 54 which is housed in chamber 48. A spring retaining disc 56 is affixed to the upper ring portion end 42. As the resilient rod projection 52 is depressed by exerting pressure with a fingernail, projection 52 is disengaged from the openings 54 molded into the posterior upper lens rings 30 and 32. This allows coil spring 54 to compress within chamber 43, causing split ring 26 to open. As the slit ring 26 opens and upper ring portion end 42 moves away from the lower ring portion end 44, the eyeglass lenses 12 and 14 may be removed or inserted. During insertion of lenses, correct prescription axis alignment is achieved by rotating lenses 12 and 14 until notches 62 and 64 mate with projections 58 and 60. When lenses 12 and 14 are properly aligned within lens mounting rings 26 and 28, thumb and finger pressure is applied to the upper 30 and 32 and lower 34 and 36 lens ring portions, bringing them closer together until resilient rod projection 52 pretend through appropriate openings 53, thereby locking lens mounting rings 26 and 28 around the outer edges of lenses 12 and 14 therein disposed and held.

Figure 4:
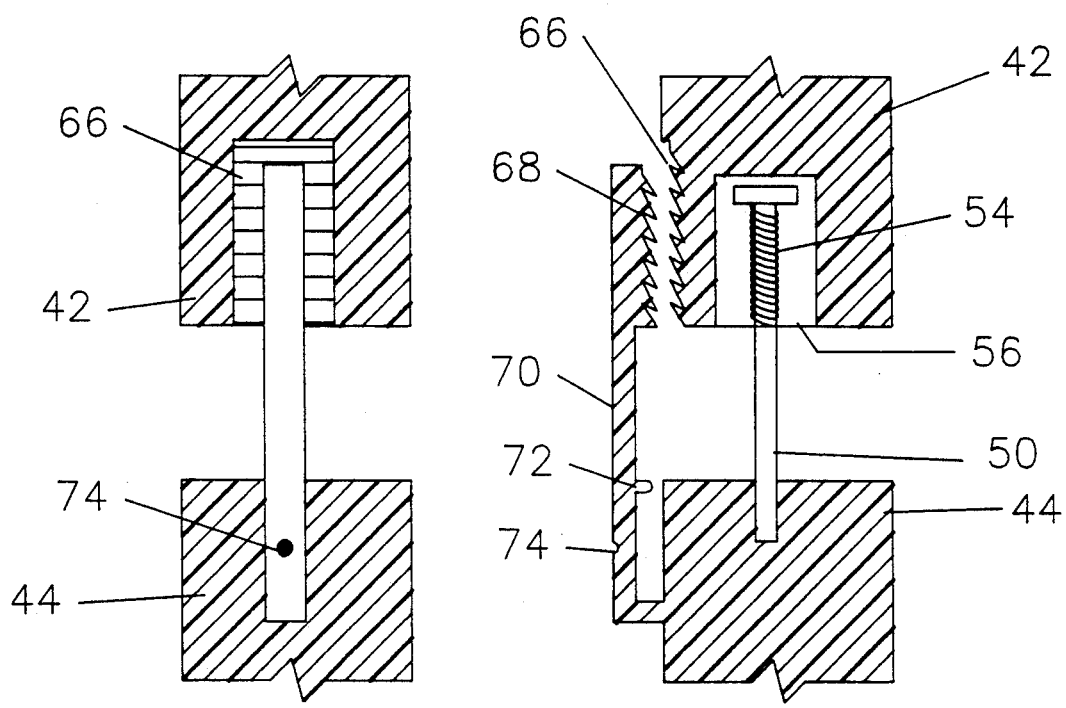
FIG. 4 is a partial cross-section of FIG. 1 along section line 2—2 showing an alternative serrated safety locking system of the invention of FIG. 1.
Figure 5:
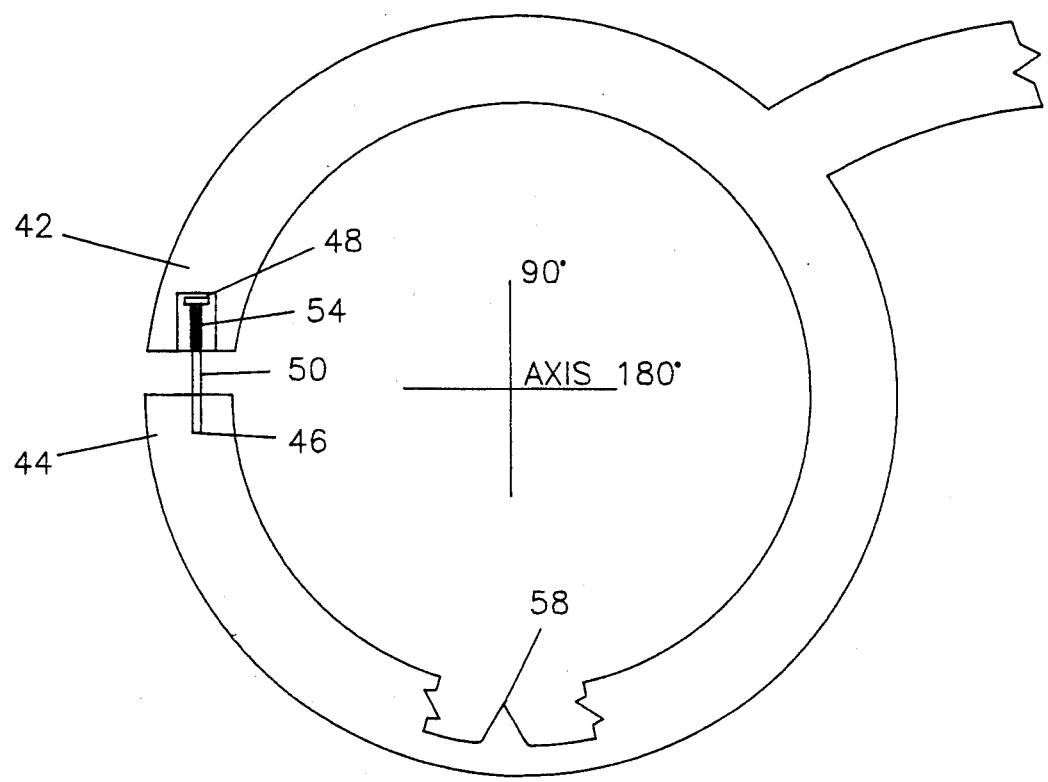
FIG. 5 is a partial perspective of the lens ring showing the lens ring projection of the prescription axis alignment system on the 90° axis.
Figure 6:
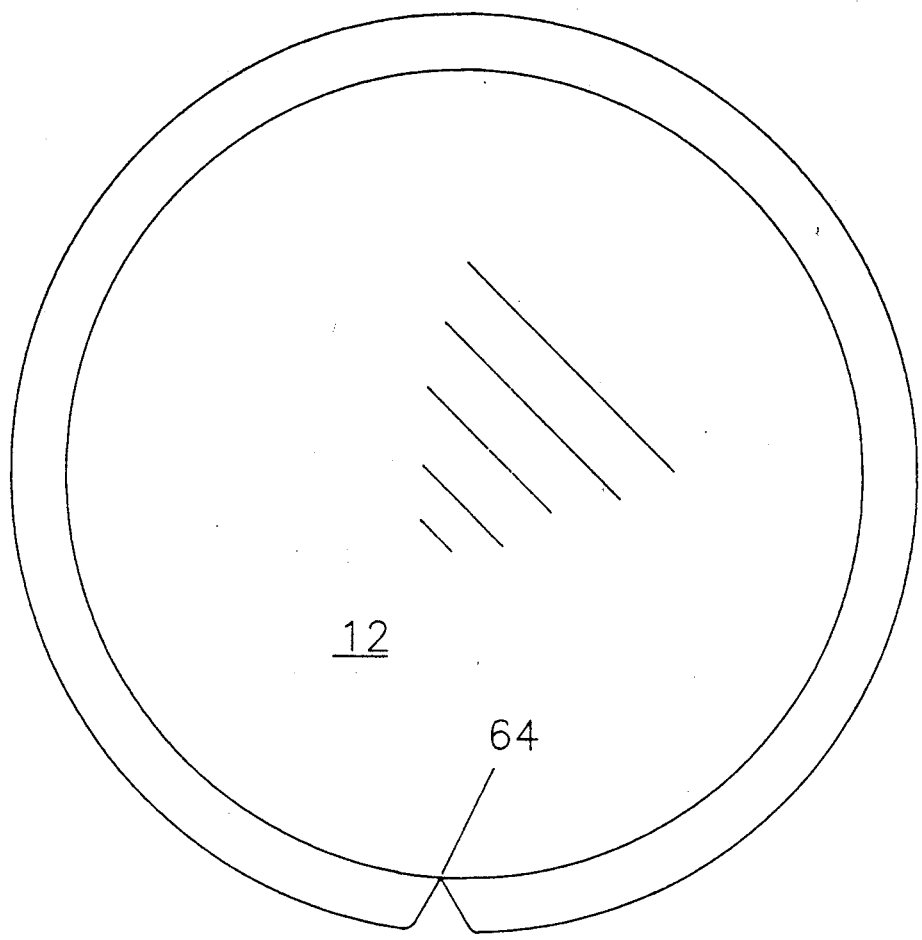
FIG. 6 is the mating notch on the lens to receive the projection shown in FIG. 5 of the prescription axis alignment system.

FIG. 4 shows an alternative embodiment o the invention wherein upper ring portion end 42 and lower ring portion end 44 are secured by means of serrated edges 66 and 68. Serrated coupling projection 70 with fulcrum 72 and finger slot 74 is affixed to lower ring portion end 44. By exerting pressure on finger slot 74, fulcrum 72 disengages serrated edges 66 and 68, causing lens ring portion ends 42 and 44 to open, permitting insertion or removal of lenses in the manner described in the preferred embodiment.

The described invention is superior to other eyeglass frames having detachably mounted lenses in that it provides for proper prescription axis alignment and a safety locking device while affording economy and ease of manufacture.

The foregoing description of the preferred embodiment other invention has been presented for the purpose of illustration and and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An eyeglass frame adapted to receive removable lenses comprising:
   a. a pair of split lens rings wherein each of said lens rings includes a projection to receive and retain a prescription eyeglass lenses;
   b. temple means endured to each of said lens rings;
   c. at least one resilient rod and coil spring locking device connected to each of split lens rings for opening and closing said split to allow said eyeglass to be retained to removed from said split lens, said resilient rod and coil spring locking device forming an integral part of said split and capable of being loosened or tightened by hand without the said of a separate instrument.

2. The eyeglass frame of claim 1 wherein said coil spring and resilient rod are disposed at the junction of said temple means and said pair of split lens rings.

3. The eyeglass frame of claim 2 wherein each of said split lens rings are split to form an upper ring portion and a lower ring portion relative to said temple means.

4. The eyeglass frame of claim 1 wherein each of said split lens rings are split to form an upper ring portion and a lower ring portion relative to said temple means, said coil spring and resilient rod going disposed at the junction of said upper and lower ring portions.

5. The eyeglass frame of claim 1 wherein said projection is molded into the lens rings at a predetermined axis.

6. The eyeglass frame of claim 1 wherein each of said prescription eyeglass lenses includes a notch cut on a predetermined axis to mate with the respective lens ring projection.

* * * * *